June 7, 1938.  A. B. SCOTT  2,120,005

COOLING SYSTEM FOR PROJECTION MACHINES

Filed Sept. 30, 1935

INVENTOR.
Albert B. Scott
BY Lyon & Lyon
ATTORNEYS

Patented June 7, 1938

2,120,005

UNITED STATES PATENT OFFICE 2,120,005

COOLING SYSTEM FOR PROJECTION MACHINES

Albert B. Scott, Los Angeles, Calif.

Application September 30, 1935, Serial No. 42,803

7 Claims. (Cl. 88—17)

This invention relates to air cooling systems for projection machines, and the invention is particularly applicable to a type of machine in which the film is guided through a film tunnel or guide tunnel in passing out of the vicinity of the lens and back to a reel on which the film is being wound. It is well known that in projection machines, the films may become highly heated to a dangerous point.

One of the objects of this invention is to provide means for isolating a portion of the film during its passage through the machine, and to provide means for effectively subjecting the film to a cooling air current.

A further object of the invention is to provide a cooling system of this kind, which will operate effectively to change the air constantly within the casing of the machine, and circulate air alongside of the film and through the lamp housing so as to maintain the apparatus at a safe temperature.

A further object of the invention is to provide a machine of this kind with a special construction of casing, which will present a film tunnel through which the film passes, and provided with means for subjecting the film within the tunnel to a cooling air current; also to provide simple means for constantly replacing the air in the casing of the machine, cooling the lamp housing through a main air duct, and utilizing a portion of the air from this main air duct for cooling the film.

Further objects of the invention will appear hereinafter.

The invention consists in the novel parts and combination of parts to be described hereinafter, all of which contribute to produce an efficient cooling system for projection machines.

A preferred embodiment of the invention is described in the following specification, while the broad scope of the invention is pointed out in the appended claims.

Figure 2:
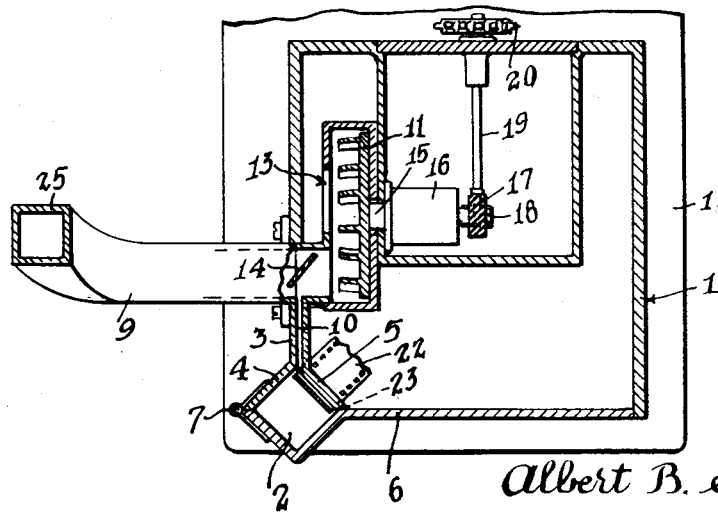
Fig. 2 is a horizontal cross-section taken about on the line 2—2 of Fig. 1, certain parts being broken away.

Referring more particularly to the parts, I indicates the casing of a projection machine in the interior of which a projection mechanism, not illustrated, is mounted. In the present machine the film descends past the lens, from above, and is returned through a suitable guide to a reel on which the film is wound up after passing through the machine. In adapting my invention to a machine of this type, I prefer to construct the casing I so that it is of substantially rectangular form in cross-section. In the present instance, the casing is represented as of substantially square form. At one of the corners of the casing I form a film tunnel 2, and this is preferably accomplished by producing a quadrangular or square duct or tunnel at one of the vertical edges of the box-form casing I. In order to accomplish this, I prefer to form the rear wall 3 of the casing I with two divergent flanges 4 and 5, which are substantially perpendicular to each other so that one of the inner angles of the quadrangular tunnel lies substantially in the plane of the rear wall 3. On the outer edge of the flange 4 I prefer to attach a door 6 by hinges 7, so that when the door 6 is swung open the film tunnel and the entire casing will be open on this side. The material that forms the door is offset so as to form the two side walls of the film tunnel that lie opposite to the walls 4 and 5. Suitable means is provided for replacing the air within the casing I, and for directing cooling air through the lamp housing 8, which is located at the rear of the casing. The air current for cooling the lamp housing 8 is preferably directed through a main air duct 9, which passes out through the rear wall 3 of the casing I. In accordance with my invention I provide means for deflecting a portion of this air from the main air duct 9 into the film tunnel 2, and this may be accomplished by means of a lateral duct 10 leading off from the main duct 9 at or about the location of the rear wall, and this lateral duct 10 is located so that it admits the air into the tunnel 2 at one of the angles of the tunnel cross-section (see Fig. 2). This tunnel permits free lateral movement of the film within the same.

In order to accomplish the above purposes, I prefer to provide a circulating fan 11 mounted within the casing I near the rear wall and at a slight distance above the base 12 of the casing, and this circulating fan has an air inlet 13 on its rear side into which air flows from the interior of the casing, said air being delivered into the forward end of the main duct 9 that projects into the interior of the casing through the rear wall 3. In order to insure that a sufficient quantity of air will be deflected from the air current flow in the main duct 9, I prefer to provide an inclined deflector plate 14 which deflects a portion of the air laterally and into the lateral duct 10.

This deflector plate 14 preferably does not extend all the way across the duct 9, but should be a small plate. If desired, this plate may be made adjustable on a horizontal axis coinciding with the middle of the plate or one edge of the same.

The fan 11 may be carried on a shaft 15 mounted in a suitable bearing 16, and the end of this shaft may carry a helical gear wheel 17 driven by another gear wheel 18 carried on a shaft 19 having a sprocket wheel 20 that is driven by an endless chain that drives other mechanism of the machine.

The base 12 is preferably provided with a large opening 21 in its bottom, through which free air may pass upwardly into the casing 1.

Figure 1:
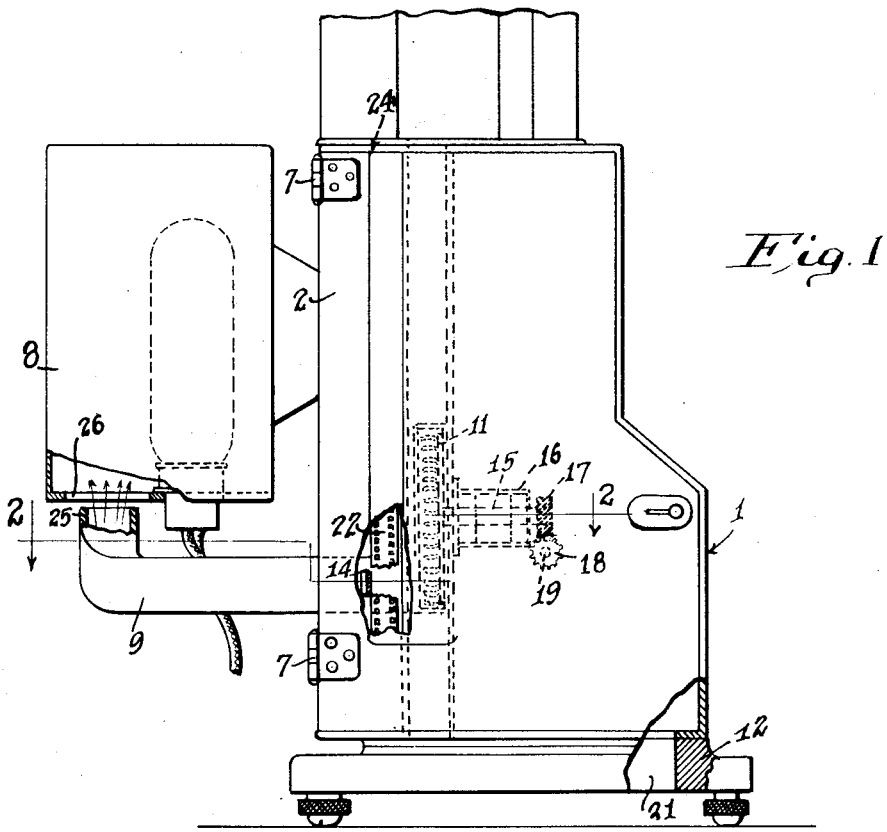
Figure 1 is a side elevation of the casing of a projection machine and indicating the position of the lamp and lamp housing; in this view certain parts are broken away so as to further illustrate the construction and general arrangement of the parts of my invention.

In using this machine the film 22 passes down into the casing through a slot formed above, and after passing the lens (not illustrated) the film passes through an opening 23 at the lower end of the tunnel, and then passes upwardly with the flat side of the film substantially parallel with the flange 5, which forms the inner wall of the film tunnel. This position for the film will bring one of its edges nearly in line with the lateral duct 10 that projects an air stream into the tunnel. The tendency of this air stream is to blow the film outwardly toward the center of the wind tunnel, and the air finds its way upwardly in the film tunnel to an exit located at about the point 24 in Fig. 1. This direction of projecting the air current into the film tunnel, therefore, tends to produce a fluttering or oscillation of the film as it passes upwardly in the tunnel, and this increases the cooling effect.

The fan 11, of course, causes an inflow of free air through any cracks in the casing wall, which is not made air-tight, and this air is forced out through the main duct 9 and the lateral duct 10 to cool the lamp housing and the film. The main air duct 9 preferably is not secured at its delivery end to the lamp housing 8, but has an upwardly projecting nozzle 25 that projects the air current upwardly through a relatively large opening 26 in the bottom of the lamp casing. This enables the air flowing in to draw in a considerable quantity of free air. The lamp housing may be constructed with any number of outlets (not illustrated) in its side wall for permitting the air to pass out of it.

It is understood that the embodiment of the invention described herein is only one of the many embodiments this invention may take, and I do not wish to be limited in the practice of the invention, nor in the claims, to the particular embodiment set forth.

What I claim is:

1. In a cooling system for projection machines, the combination of a casing having a lens and a film-guide adjacent the lens, said casing also having an elongated film tunnel in addition to said film-guide, through which the film is guided longitudinally, and in which the film is freely movable laterally, a circulating fan mounted within the casing, a lamp housing, an air duct leading from the fan to the lamp housing, and a branch duct leading from the first-named duct for delivering air into the end of the film tunnel, so that the air flows longitudinally through the tunnel, said branch duct extending laterally from the first-named duct, and said first-named duct having a deflector within the same for deflecting a portion of the air from the first-named duct into the film tunnel.

2. In a cooling system for projection machines, the combination of a casing having an air inlet, said casing being of substantially box-form and having a film tunnel at one of the vertical edges of the casing, said film tunnel being of angular form in cross-section, so as to permit free lateral movement of the film within the same, a circulating fan mounted in the casing, a lamp housing, a main air duct leading from the circulating fan to the lamp housing, and a lateral duct leading from the main air duct into the said film tunnel and entering the film tunnel at one of the corners of the same.

3. In a cooling system for projection machines, the combination of a casing of substantially box-form in horizontal cross-section, said casing having a film tunnel at one of the vertical edges of the same through which the film is guided, said film tunnel being of substantially quadrangular form and with one of its angles disposed substantially in line with the rear wall of the casing, and permitting free lateral movement of the film within the same, a circulating fan within the casing, a lamp housing back of the rear wall of the casing, a main air duct leading from the circulating fan through the rear wall for conducting air to the lamp housing, and a lateral air duct located at said rear wall for admitting a portion of the circulating air into the film tunnel.

4. In a cooling system for projection machines, the combination of a casing of substantially box-form in horizontal cross-section, said casing having a film tunnel at one of the vertical edges of the same through which the film is guided, said film tunnel being of substantially quadrangular form and with one of its angles disposed substantially in line with the rear wall of the casing, and permitting free lateral movement of the film within the same, a circulating fan within the casing, a lamp housing back of the rear wall of the casing, a main air duct leading from the circulating fan through the rear wall for conducting air to the lamp housing, a lateral air duct located at said rear wall for admitting a portion of the circulating air into the film tunnel, and a deflector plate in the main duct opposite the lateral duct for deflecting air from the main duct through the lateral duct.

5. In a cooling system for a projection machine, the combination of a casing of substantially rectangular cross-section so as to present a vertical edge, said vertical edge having a film tunnel extending along the same, a door hinged on the casing and closing the forward side of the tunnel, and means for delivering a cooling air current through the tunnel.

6. In a cooling system for a projection machine, the combination of a casing of substantially rectangular cross-section so as to present a vertical edge, said vertical edge having a film tunnel extending along the same, a door for closing the side of the casing and the outer side of the film tunnel, and means for delivering a current of air through the film tunnel.

7. In a cooling system for projection machines, the combination of a casing having an air inlet, said casing being of substantially box-form and having a film tunnel at one of the vertical edges of the casing, said film tunnel being of quadangular form in cross-section, and of greater internal width than the film so as to permit free lateral movement of the film within the same, a circulating fan mounted in the casing, a lamp housing, a main air duct leading from the circulating fan to the lamp housing, and a lateral duct leading from the main air duct into the said film tunnel and entering the film tunnel at one of the corners of the same.

ALBERT B. SCOTT.